United States Patent Office 3,409,636
Patented Nov. 5, 1968

3,409,636
ALKYL PHENOXATHIINIUM COMPOUNDS
Stanley J. Strycker, Midland, Mich., assignor to The Dow Chemical Company, Midland, Mich., a corporation of Delaware
No Drawing. Filed May 31, 1966, Ser. No. 553,701
5 Claims. (Cl. 260—327)

ABSTRACT OF THE DISCLOSURE

Novel 10-loweralkylphenoxathiinium compounds are disclosed. These compounds are prepared by treating a phenoxathiin with an alkylating agent. They are useful in achieving adrenergic blockade in animals.

---

The present invention is directed to an alkyl phenoxathiinium compound of the formula

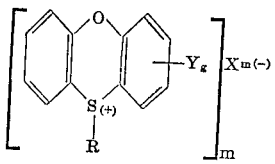

In the above and succeeding formulae, Y represents loweralkyl, trifluoromethyl, halogen, methoxy, acetyl, acetoxy, or acetamido; $g$ represents an integer of from 0 to 1, both inclusive; R represents loweralkyl; X represents a pharmaceutically acceptable anion; and $m$ represents an integer equal to the valence of the pharmaceutically acceptable anion. In the present specification and claims, the term "loweralkyl" is employed to designate alkyl radicals being of from 1 to 4, both inclusive, carbon atoms, and the term "halogen," to designate appearances of chlorine, bromine, fluorine, and iodine, only. The term "pharmaceutically acceptable anion" is employed herein, in accordance with the manner in which it is used by those skilled in the art, to designate an anion which is pharmaceutically compatible and of lower or essentially no toxicity. The choice of the anion is not critical, although a given anion may in some instances exhibit special advantages, due to solubility, ease of crystallization, lack of objectionable taste and the like. Representative pharmaceutically acceptable anion moieties include the following chloride, bromide, iodide, sulfate, bisulfate, acetate, salicylate, valerate, oleate, phenate, laurate, borate, fluoborate, benzoate, lactate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, carbonate, cacodylate, aconitate, sulfamate, gentisate, malate, cinnamate, stearate, and the like.

The products of the present invention are crystalline solids or viscous liquid materials. They are prepared by alkylation of a corresponding phenoxathiin starting compound:

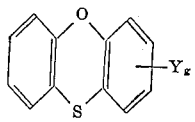

The alkylating agent can be any of those typically employed in such procedures; however, dimethyl sulfate has been found to be especially suited and preferred. In this instance, the product resulting from the reaction is of the following formula:

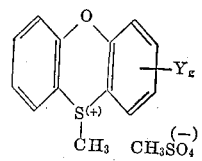

that is, product wherein X (the pharmaceutically acceptable anion) represents methyl sulfate and $m$ is, as a consequence, 1. Many of the products wherein the identity of X, $m$, and/or the loweralkyl groups is different can similarly be prepared directly in this reaction, by appropriate selection of the alkylating agent. However, it is generally preferred to prepare most of the other products of the present invention in a separate reaction in which the corresponding products, wherein X is methyl sulfate, are reacted with a metal salt having the desired pharmaceutically acceptable anion. This reaction is described in more detail hereinbelow.

The reaction of the phenoxathiin compound and the alkylating agent is conveniently carried out in the presence of an inert liquid reaction medium, typically an organic liquid. Representative suitable organic liquids include the chlorinated hydrocarbons, such as chlorobenzene and methylene chloride; alcohols, such as methanol and isopropanol; hydrocarbons, such as benzene, cyclohexane, and hexane; and ethers, such as diethyl ether. The amounts of the reactants employed are not critical, some of the desired product being prepared when employing any amounts. The reaction consumes the reactants in amounts representing equimolecular proportions. However, in order to assure complete alkylation, it is sometimes preferred to employ excess alkylating agent, such as one molecular proportion of phenoxathiin compound and from one to ten molecular proportions of alkylating agent. The reaction goes forward under temperatures of a wide range, such as from 0° to 200° C., but is preferably carried out at temperatures from 85° to 120° C.

In carrying out the reaction, the phenoxathiin compound is contacted with the alkylating agent in any convenient manner, typically by adding one reactant to the other reactant, in the presence of the reaction medium when so employed. The temperature of the resulting reaction medium can be controlled by regulating the rate of the contacting of the reactants, as well as by external heat exchanging means. Upon completion of the contacting of the reactants, most of the reaction will have taken place with the production of the desired product. Where optimum yields are desired, it is sometimes preferred that the reaction mixture be allowed to stand for a period of time to insure completion of reaction. Inert liquid reaction medium, when employed, can be removed from the reaction mixture by evaporation under subatmospheric pressure to obtain the desired product as a residue. This product residue can be purified by any of the conventional procedures, such as washing with suitable solvent or recrystallization.

Those products of the present invention which can not, or can not conveniently, be prepared by the reaction set forth foregoing can be prepared, as noted above, by an ion-exchange reaction. In this procedure, any product which can conveniently be prepared in accordance with the foregoing synthesis method is itself reacted with a metal salt having the desired pharmaceutically acceptable anion. Typically, sodium or alkali metal salts are employed, although the identity of the metal is not critical. The reaction is conveniently carried out in an inert liquid reaction medium. Although the reaction consumes the reactants in amounts representing stoichiometric proportions, it is preferred to use an excess of the metal salt. Hence, for example, in the instance wherein $m$ in both the starting product and the final product represents 1, it is preferred to use one molecular proportion of starting product and from one to ten molecular proportions of the metal salt compound. The reaction goes forward under temperatures of a wide range, such as from 0° to 100° C., with the production of the product having the desired X anion and a byproduct metal methyl sulfate salt.

Typically, the reaction is carried out by adding the methyl sulfate product to a saturated aqueous solution of a metal salt having the desired anion. The solution is heated to the preferred temperature range, usually prior to addition of the methyl sulfate product. Upon completion of the addition, most of the reaction will have taken place with the preparation in the reaction mixture of product having the desired anion; however, it is sometimes preferred to permit the reaction mixture to stand for an additional period of time to complete the reaction. The desired product is conveniently separated by cooling the reaction mixture; such cooling results either in the precipitation of the product, which can then be separated by filtration, or in the separation of the porduct as a liquid phase, which can then be separated by decantation. Purification, if desired, is carried out in conventional procedures, such as recrystallization and washing with suitable solvent.

The following examples illustrate the present invention and will enable those skilled in the art to practice the same.

Example 1.—10-methylphenoxathiinium methyl sulfate

Phenoxathiin (20.0 grams; 0.10 mole) and dimethyl sulfate (12.6 grams; 0.10 mole) were mixed and the resulting reaction mixture heated, with stirring, to a temperature of about 100° C. The reaction mixture was thereafter maintained, with continued stirring, at a temperature of 95–105° C. for an additional three hours.

The resulting reaction mixture was permitted to cool to room temperature; during the cooling, the reaction mixture set up as a solid mass of white crystals, constituting the desired 10-methylphenoxathiinium methyl sulfate product. These crystals were taken up in hot isopropanol and the resulting isopropanol solution filtered and cooled; during the cooling, the product precipitated in the reaction mixture and was separated by filtration and air-dried. The product thus obtained was found to melt at 133.5–134.5° C.

Example 2.—10-methylphenoxathiinium fluoborate

The product obtained as a result of the operations reported in Example 1, after two additional recrystallizations from isopropanol, was added portionwise over a period of time to a hot saturated solution of sodium fluoborate (NaBF$_4$). The resulting reaction mixture was filtered and cooled; during the cooling the desired 10-methylphenoxathiinium fluoborate product precipitated in the reaction mixture and was separated by filtration. The separated product was air-dried and recrystallized from ethanol. The product thus obtained was found to melt at 180–186° C.

Example 3.—10-ethylphenoxathiinium fluoborate

Triethyloxonium fluoborate (10 grams; 0.052 mole) was added portionwise over a period of time to a solution of phenoxathiin (10 grams; 0.05 mole) in 125 milliliters of methylene chloride. The phenoxathiin solution was at room temperature. After the completion of the addition, the resulting reaction mixture was stirred at room temperature for a period of about 24 hours. Thereafter, methylene chloride was removed from the reaction mixture by evaporation under subatmospheric pressure to obtain the desired 10-ethylphenoxathiinium fluoborate product as a liquid residue. Trituration with diethyl ether caused the product residue to crystallize. The crystallized product was separated by filtration, air-dried, and recrystallized from ethanol. The product thus obtained was found to melt at 125–127.5° C.

In view of the foregoing examples and teachings, those skilled in the art will be enabled to prepare all of the products of the present invention. Representative such products include the following (the symbol "M.W." being employed as an abbreviation of the term molecular weight): 1-chloro-10-methylphenoxathiinium methyl sulfate, M.W. 360.9; 2,10-dimethylphenoxathiinium methyl sulfate, M.W. 340.4; 2-chloro-10-methylphenoxathiinium fluoborate, melting, with decomposition, at 212–215° C.; 2,10-dimethylphenoxathiinium acetate, M.W. 288.4; 2-ethyl-10-methylphenoxathiinium chloride, M.W. 279; 2-tert-butyl-10-ethylphenoxathiinium bromide, M.W. 365.4; 2-acetyl-10-methylphenoxathiinium sulfate, M.W. 610.7; 4-bromo-10-methylphenoxathiinium phenate, M.W. 387.3; 2-fluoro-10-ethylphenoxathiinium salicylate, M.W. 384.4; 2-iodo-10-n-propylphenoxathiinium citrate, M.W. 1296.9; 10-sec-butylphenoxathiinium laurate, M.W. 456.7; 3-acetamido-10-methylphenoxathiinium tartrate, M.W. 692.8; 2-acetoxy-10-methylphenoxathiinium methyl sulfate M.W. 384.4; 2-methoxy-10-ethylphenoxathiinium fluoborate, M.W. 346.2; 10-isobutylphenoxathiinium iodide, M.W. 384.3; and 2-(trifluoromethyl)-10-methylphenoxathiinium malate, M.W. 698.7.

The products of the present invention are useful for studying and controlling the behavior of animals such as mice, rats, dogs, and monkeys. In particular, the products are useful in achieving adrenergic blockade. The products can be employed in unmodified form; generally, however, it is preferred that the products be employed in modified form, that is, as a composition containing one or more of the product(s) and a pharmaceutically acceptable adjuvant. Administration is preferably made by an intravenous or intraperitoneal route, the products being of generally lesser effectiveness when administered orally. The products effect adrenergic blockade in rabbits or dogs at rates of from 4 to 16 or more milligrams per kilogram of individual animal body weight.

In representative operations, 10-methylphenoxathiinium fluoborate was administered to a group of dogs at the rate of 16 milligrams of the compound per kilogram of individual animal body weight. At intervals of 6, 18, and 24 hours following this administration, the dogs were challenged by administration of a quantity of 1-epinephrine normally sufficient to create a marked increase in blood pressure. The blood pressure of the dogs was observed throughout the entire evaluation period, and it was determined that following each of the challenges with 1-epinephrine, the dogs either exhibited no blood pressure rise or exhibited only slight blood pressure rise.

The materials which serve as the phenoxathiin starting compound, hereinabove defined as being of the following formula:

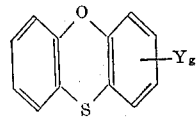

are themselves prepared in known methods. Most typically, the Ferrario reaction is employed. In this reaction, a diphenyl ether of the formula:

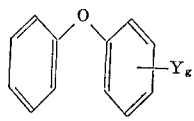

is reacted with sulfur in the presence of aluminum chloride. The procedures for carrying out the reaction are known. In an alternate procedure, it is sometimes more convenient to obtain certain of the substituted starting materials (those wherein $g$ represents 1) by reacting unsubstituted phenoxathiin with an agent appropriate to the introduction of the desired Y substituent.

I claim:
1. Compound of the formula

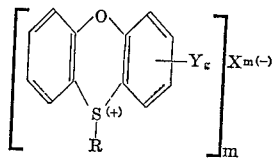

wherein Y represents loweralkyl, trifluoromethyl, halogen, methoxy, acetyl, acetoxy, or acetamido; $g$ represents an integer of from 0 to 1, both inclusive; R represents loweralkyl; X represents a pharmaceutically acceptable anion; and $m$ represents an integer equal to the valence of the pharmaceutically acceptable anion.

2. The compound of claim 1 wherein R represents methyl, $g$ represents 0, and X represents fluoborate, namely 10-methylphenoxathiinium fluoborate.

3. The compound of claim 1 wherein R represents methyl, $g$ represents 0, and X represents methyl sulfate, namely 10-methylphenoxathiinium methyl sulfate.

4. The compound of claim 1 wherein R represents methyl, $g$ represents 1, Y represents chloro and is located at the 2-position, and X represents fluoborate, namely 2-chloro-10-methylphenoxathiinium fluoborate.

5. The compound of claim 1 wherein R represents ethyl, $g$ represents 0, and X represents fluoborate, namely 10-ethylphenoxathiinium fluoborate.

References Cited

UNITED STATES PATENTS 3,299,098  1/1967  Reifschneider _____ 260—327

JAMES A. PATTEN, *Primary Examiner.*